United States Patent
Dameron et al.

(10) Patent No.: US 11,625,053 B2
(45) Date of Patent: Apr. 11, 2023

(54) AWAY MODE FOR A COMPRESSED AIR SYSTEM

(71) Applicant: Ingersoll-Rand Industrial U.S., Inc., Davidson, NC (US)

(72) Inventors: Robert J. Dameron, Charlotte, NC (US); Titilope Z. Sule, Columbia Heights, MN (US); Brian D. Wise, Charlotte, NC (US); Jason A. Roberge, Cornelius, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 157 days.

(21) Appl. No.: 17/137,622

(22) Filed: Dec. 30, 2020

(65) Prior Publication Data

US 2022/0206518 A1 Jun. 30, 2022

(51) Int. Cl.
*G05D 16/20* (2006.01)
*G05B 19/042* (2006.01)

(52) U.S. Cl.
CPC ....... *G05D 16/2066* (2013.01); *G05B 19/042* (2013.01); *G05B 2219/23258* (2013.01)

(58) Field of Classification Search
CPC ............. G05D 16/2066; G05D 16/202; G05B 19/042; G05B 2219/23258
See application file for complete search history.

(56) References Cited

U.S. PATENT DOCUMENTS

| | | | | |
|---|---|---|---|---|
| 2004/0189590 A1* | 9/2004 | Mehaffey | ........... | G05D 16/2066 345/156 |
| 2004/0193330 A1* | 9/2004 | Mehaffey | .............. | F04B 49/065 700/301 |
| 2007/0077151 A1* | 4/2007 | Hirasawa | .............. | F04B 49/022 417/5 |
| 2014/0140813 A1* | 5/2014 | Ochi | ....................... | F04D 13/12 415/13 |
| 2015/0370265 A1* | 12/2015 | Ren | ........................ | F04C 14/02 137/565.29 |

* cited by examiner

*Primary Examiner* — Charles R Kasenge
(74) *Attorney, Agent, or Firm* — Kevin E West; Advent, LLP

(57) ABSTRACT

A control system for a compressed air system is configured to implement an "away mode" of operation that provides for a temporary override of the operation of the compressed air system, which can be easily enabled and disabled. During a period of down time, when the away mode of operation is enabled, the control system causes the compressed air system to operate in a limited capacity (e.g., maintaining limited system pressure, flow, higher dewpoint/humidity level, etc.) to minimize energy usage and limit unnecessary wear on system equipment without shutting down the compressed air system.

17 Claims, 8 Drawing Sheets

AWAY MODE FOR A COMPRESSED AIR SYSTEM

BACKGROUND

Compressed air systems are used in a variety of industries to furnish compressed air to power air powered devices in such as tools, manufacturing fixtures, and the like. Typical compressed air systems employ one or more centrally located compressors that use motive power from an electric motor, a diesel engine, or a gasoline engine to compress and pressurize air, which is then stored in a receiver such as an air storage tank. This compressed air is then released as desired to power the air powered devices.

BRIEF DESCRIPTION OF THE DRAWINGS

The Detailed Description is described with reference to the accompanying figures. The use of the same reference numbers in different instances in the description and the figures may indicate similar or identical items.

DETAILED DESCRIPTION

Overview

Figure 1A:
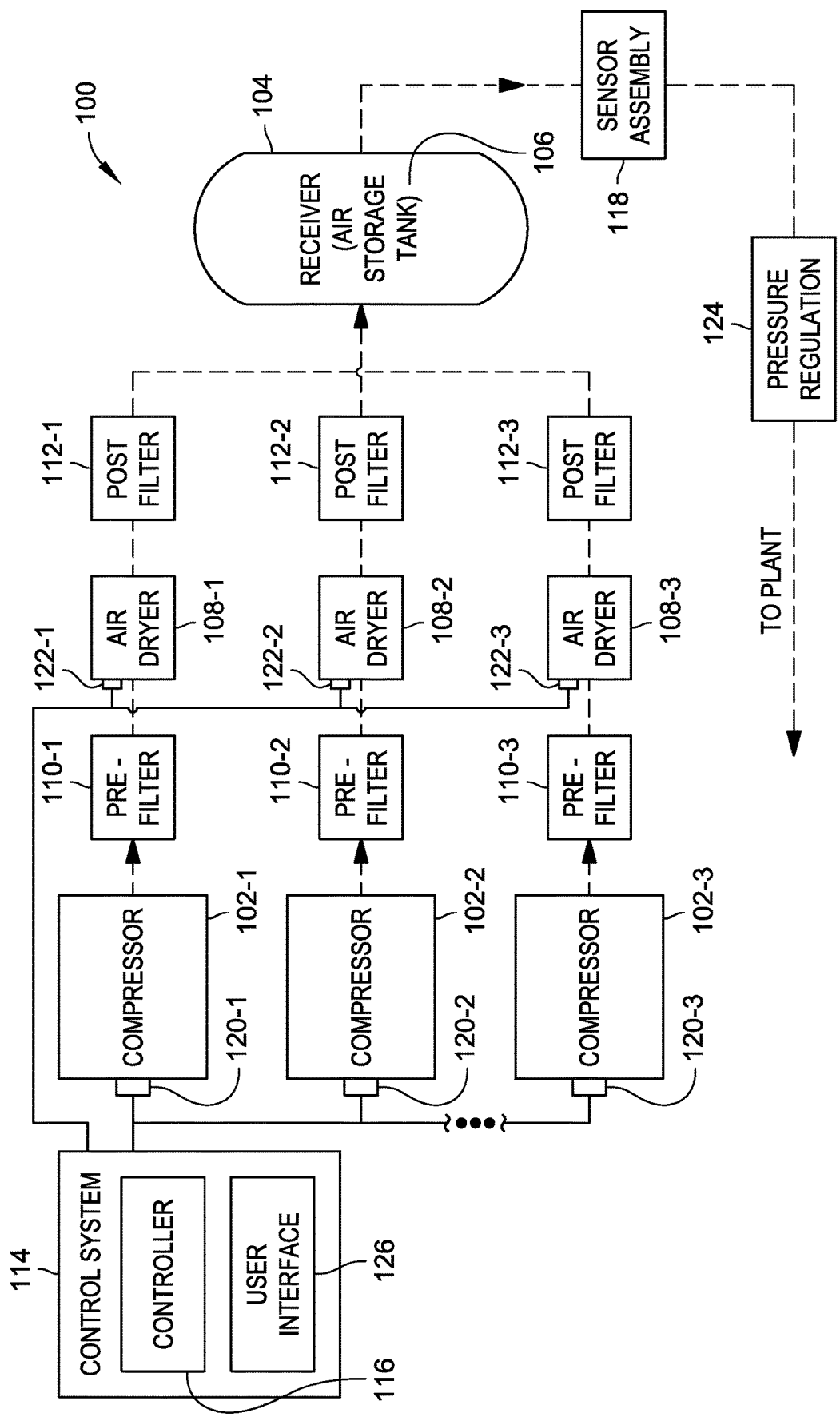
FIG. 1A is a block diagram illustrating a compressed air system in accordance with an example embodiment of the present disclosure.

Many compressed air systems employ a control system that manages the operation of the equipment and components of the compressed air system to enhance the system's efficiency and improve its reliability. Such control systems often allow operators to create a regular schedule of high and low usage of compressed air to support a set production schedule. Moreover, to improve efficiency, some components of some compressed air systems (e.g., compressors, air dryers, etc.) may automatically shut down during low usage and then restart during high usage without operator control. However, present control systems do not provide an easy method to override the regular schedule of usage for occasional periods of down time such as temporary plant shut-downs, holiday periods, and so forth. During these periods of down time, operators must either allow the compressed air system to operate according to the regular schedule of usage (e.g., as if normal plant shifts are still active), or they must completely shut down the compressed air system, whereupon the various equipment within the system typically must be manually re-started in so that the compressed air system can be operational when the plant's production schedule resumes. This manual restart may be time consuming and costly.

Accordingly, the present disclosure is directed to a control system for a compressed air system, wherein the control system is configured to implement an "away mode" of operation that provides for a temporary override of the operation of the compressed air system, and which can be easily enabled and disabled. During a period of down time, when the away mode of operation is enabled, the control system causes the compressed air system to operate in a limited capacity (e.g., by maintaining limited system pressure, higher humidity or dew point levels, and so forth) to minimize energy usage and limit unnecessary wear on system equipment without shutting down the compressed air system.

In an embodiment, an example control system for a compressed air system that is operable to implement an away mode of operation in accordance with the present disclosure is described. The control system includes a sensor assembly configured to sense a pressure of the compressed air in the compressed air system, a controller, and at least one compressor. The controller is communicatively coupled with the sensor assembly and the at least one compressor. During normal operation, the controller is configured to cause the at least one air compressor to maintain the pressure of compressed air in the compressed air system, as sensed by the sensor assembly, above a first pressure (an operational pressure setpoint) that is sufficient to operate one or more air powered devices such as air powered tools, air powered manufacturing fixtures, or the like. The controller is further configured turn the at least one air compressor off (e.g., during shut down of the compressed air system for system maintenance), wherein the pressure of compressed air in the compressed air system is not maintained. In accordance with the present disclosure, the controller is configured to receive an input (e.g., an operator enabling an away mode of operation via a user interface), and, in response to the input, cause the at least one air compressor to maintain the pressure of compressed air in the compressed air system, as sensed by the sensor assembly, to be maintained above a second (away mode) pressure that is less than the first (operational) pressure, for a period of time (e.g., an away mode pressure setpoint selected by the operator that is less than a normal operational pressure setpoint of the compressed air system during the a selected period of down time).

In another embodiment, an example compressed air system that is operable to implement an away mode of operation in accordance with the present disclosure is described. The compressed air system comprises at least one air compressor configured to supply compressed air to the compressed air system, a sensor assembly configured to sense a pressure of compressed air in the compressed air system, a controller communicatively coupled with the compressor and the sensor assembly, and a user interface. The controller is configured to receive a pressure of the compressed air in the compressed air system that is sensed by the sensor assembly and cause the at least one air compressor to maintain the pressure of compressed air in the compressed air system, as sensed by the sensor assembly, above a first pressure (operational pressure setpoint) that is sufficient to operate one or more air powered devices. In response an input from the user interface (e.g., due to an operator enabling an away mode of operation via the user interface), the controller is configured to cause the at least one air compressor to maintain the pressure of compressed air in the compressed air system, as sensed by the sensor assembly, above a second pressure that is less than the first pressure. The controller causes the at least one air compressor to maintain the second pressure for a period of time (e.g., an away mode pressure setpoint selected by the operator that is less than a normal operational pressure setpoint of the compressed air system during the selected period of down time). After the period of time has expired (e.g., after the selected period of down time has ended), the controller may then cause the at least one air compressor to again maintain the pressure of compressed air in the compressed air system, as sensed by the sensor assembly, above the first pressure (operational pressure setpoint).

In a further embodiment, an example method for implementing an away mode of operation is described. The method may be implemented by a control system for controlling operation of a compressed air system having at least one air compressor operable to supply compressed air to system. The method includes the steps of receiving a pressure of the compressed air in the compressed air system sensed by a sensor assembly of the system; causing the at least one air compressor to maintain the pressure of compressed air in the compressed air system sensed by the sensor assembly above a first pressure (operational pressure setpoint) sufficient to operate one or more air powered devices; receiving an input from a user interface (e.g., due to an operator enabling an away mode of operation via the user interface); and in response to the input, causing the at least one air compressor to maintain the pressure of compressed air in the compressed air system, as sensed by the sensor assembly, above a second pressure that is less than the first pressure for a period of time (e.g., an away mode pressure setpoint selected by the operator that is less than a normal operational pressure setpoint of the compressed air system during the selected period of down time). In embodiments, the method may be implemented as a program of instructions (e.g., software, firmware, etc.) executed by a controller of the control system.

Example Embodiments

FIG. 1A illustrates a compressed air system 100 in accordance with an example embodiment of the present disclosure. As shown, the compressed air system 100 includes compressors 102-1, 102-2, 102-3 that use motive power to compress and pressurize a gas, in particular air, which is then stored in a receiver 104 such as an air storage tank 106. The 5 compressed air from the respective compressors 102-1, 102-2, 102-3 may then be passed through various air treatment equipment that condition the compressed air prior to storage in the air receiver 104. For example, in the embodiment illustrated, the respective compressors 102-1, 102-2, 102-3 are each coupled with an air dryer 108-1, 108-2, 108-3, which removes water vaper from the compressed air supplied by that compressor 102-1, 102-2, 102-3. Pre-filters 110-1, 110-2, 110-3 are provided between the compressors 102-1, 102-2, 102-3 and the air dryers 108-1, 108-2, 108-3 to filter contaminants such as oil, particulates, and water from the compressed air prior to the air being provided to the air dryers 108-1, 108-2, 108-3. Similarly, post-filters 112-1, 112-2, 112-3 are provided between the air dryers 108-1, 108-2, 108-3 and the receiver 104 (compressed air tank 106) to filter additional contaminants such as oil, particulates, and water from the compressed air prior to the air being provided to the receiver 104 (air storage tank 106). In this manner the pre-filters 110-1, 110-2, 110-3 and post-filters 112-1,112-2, 112-3 function to protect the air dryers 108-1, 108-2, 108-3 and downstream components (e.g., air lines, the receiver 104 (air storage tank 106), pressure regulator(s) 124, air-powered devices coupled to the compressed air system 100, etc.) from damage caused by contaminants.

In embodiments, the compressors 102-1, 102-2, 102-3 may be electrically powered and thus employ electric motors to furnish motive power to pressurize and compress ambient air and furnish compressed air to the compressed air system 100. However, it is contemplated that one or more of the compressors 102-1, 102-2, 102-3 may instead be powered by diesel engines, gasoline engines, or the like. The compressors 102-1, 102-2, 102-3 may employ any of a variety of air compression technologies. For example, in various embodiments, the compressors 102-1, 102-2, 102-3 may be rotary screw compressors, reciprocating compressors (e.g., single-stage reciprocating compressors, two-stage reciprocating compressors), centrifugal compressors, scroll compressors, PET (polyethylene terephthalate) compressors (e.g., four-stage centrifugal or four-stage reciprocating compressors), combinations thereof, and so forth. Additionally, in embodiments, the compressors 102-1, 102-2, 102-3 may be oil-flooded, oil-lubricated, or oil-less. Thus, the compressors 102-1, 102-2, 102-3 may, for example, comprise oil flooded rotary screw compressors, oil lubricated reciprocating compressors, lubricated scroll compressors, oil-less reciprocating compressors, oil-less scroll compressors, and so forth.

In embodiments, the air dryers 10 may employ any of a variety of air-drying technologies to remove water vaper (moisture) from the compressed air. For example, the air dryers 108-1, 108-2, 108-3 may comprise heatless desiccant dryers, heated desiccant dryers, non-cycling refrigerated dryers, cycling refrigerated dryers, heat-of-compression (HOC) desiccant dryers, deliquescent dryers, membrane dryers, subfreezing dryers, combinations thereof, and so forth. Similarly, the pre-filters 110-1, 110-2, 110-3 and post-filters 112-1, 112-2, 112-3 may employ a variety of filtering technologies. In embodiments, pre-filters 110-1, 110-2, 110-3 and/or post-filters 112-1, 112-2, 112-3 may comprise coalescing filters.

The receiver 104 may comprise one or more pressure vessels (pressure tanks) that store compressed air (a single air storage tank 106 is shown). In embodiments, the receiver 104 is sized to have sufficient compressed air storage capacity to meet peak demand events and control the rate of pressure change in the compressed air system 100 during use.

During operation, the compressors 102-1, 102-2, 102-3 pressurize and compress air that is then dried and filtered via air dryers 108-1, 108-2, 108-3, pre-filters 110-1, 110-2, 110-3, and post-filters 112-1, 112-2, 112-3, and stored by the receiver 104. For example, the compressed air may be forced into the air storage tank 106, increasing the pressure withing the air storage tank 106. When the pressure within the air storage tank 106 reaches a preset upper limit pressure, the air compressors 102-1, 102-2, 102-3 discontinue compressing air (e.g., are shut off). The compressed air is then held in the air storage tank 106 until used. As the compressed air is used, the air storage tank 106 depressurizes. When pressure within the air storage tank 106 reaches a preset lower limit pressure, the air compressors 102-1, 102-2, 102-3 are again turned on to re-pressurize the air storage tank 106. In this manner, the air compressor system 100 maintains an operational pressure sufficient to operate one or more air powered devices of the plant. In embodiments, the operational pressure is equal to the lower limit pressure or less than the lower limit pressure by a predetermined tolerance.

The compressed air system 100 includes a control system 114 that manages the operation of the equipment of the compressed air system 100 (e.g., compressors 102-1, 102-2, 102-3, air dryers 108-1, 108-2, 108-3, pre-filters 110-1, 110-2, 110-3, post-filters 112-1,112-2, 112-3, receiver 104, etc.) to enhance the system's efficiency and improve its reliability. As shown in FIG. 1A, the control system 114 may comprise a controller 116, a sensor assembly 118, control devices 120, 122 for controlling operation of the components of the compressed air system, for example, by turning on/off components, controlling the operation of components (e.g., operational speed, pressure, flow, humidity or dew point level, temperature, etc.). In the embodiment illustrated, the control system 114 includes control devices 120-1, 120-2, 120-3 that control operation of respective compressors 102-1, 102-2, 102-3 and control devices 122-1, 122-2, 122-3 that control operation of the air dryers 108-1, 108-2, 108-3. One or more pressure/flow regulators (pressure/flow controllers) 124 may further regulate the pressure and/or flow of compressed air provided to the plant by the compressed air system 100 to ensure that that the pressure and flow is sufficient for the air-powered devices of the plant.

The control system 114 further includes a user interface 126. The user interface 126 furnishes information generated by the controller 116 describing the operation of the operation of the compressed air system 100 to the operator and allows the operator to furnish input to the controller 116 to manage the operation of the equipment of the compressed air system 100 (e.g., compressors 102-1, 102-2, 102-3, air dryers 108-1, 108-2, 108-3, pre-filters 110-1, 110-2, 110-3, post-filters 112-1, 112-2, 112-3, receiver 104, etc.). In various embodiments, the user interface 126 may be integrated with the controller 116 as a unitary component or may be a separate component communicatively coupled with the controller 116.

Figure 1B:
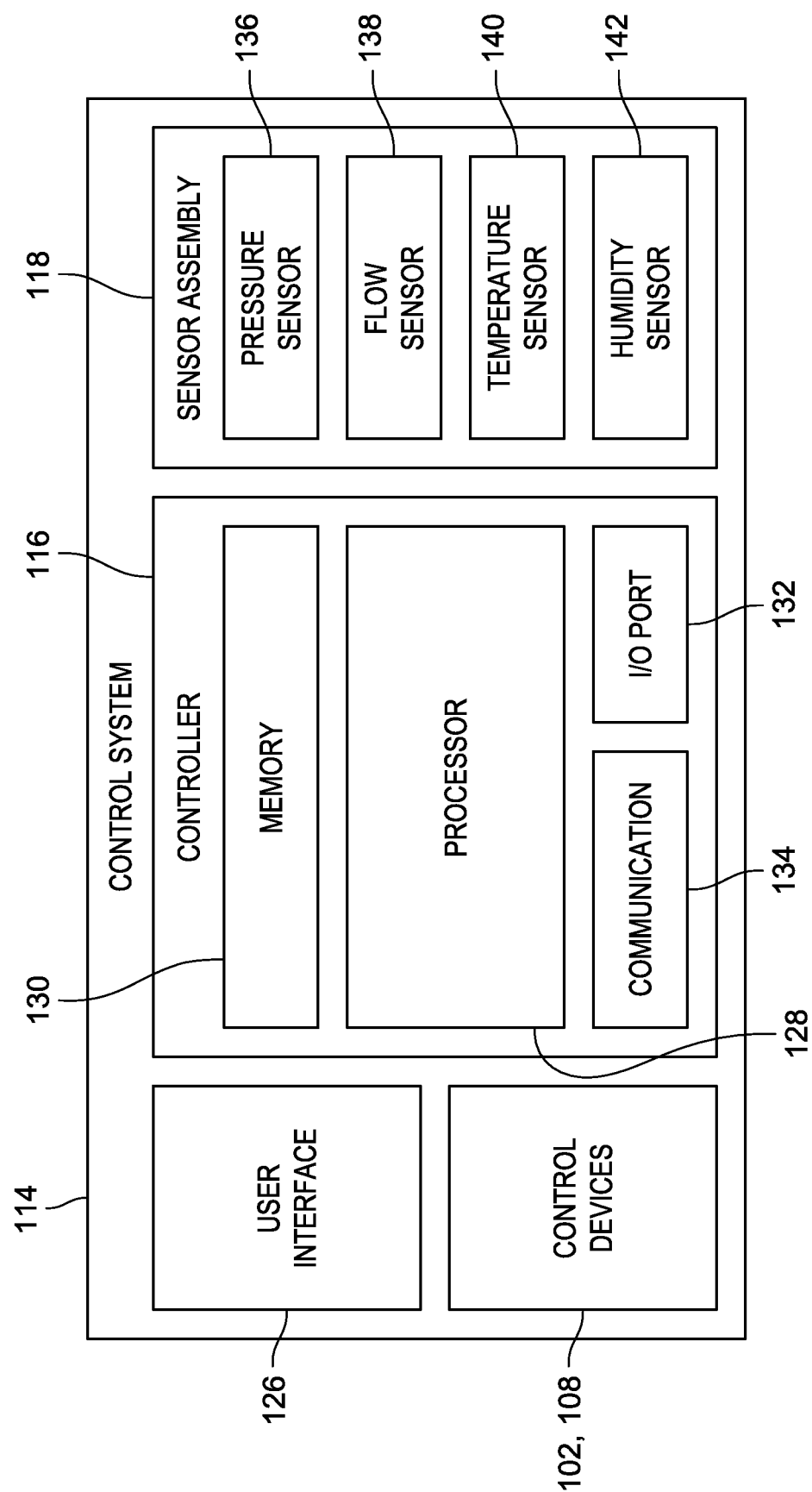
FIG. 1B is a block diagram further illustrating the control system of the compressed air system shown in FIG. 1A that is configured to implement an away mode of operation of the compressed air system in accordance with an example embodiment of the present disclosure.

FIG. 1B further illustrates the control system 114 of the compressed air system 100 shown in FIG. 1A. In the embodiment illustrated, the control system 114 is comprised of the controller 116, the sensor assembly 118, the control devices 120 (e.g., control devices 120-1, 120-2, 120-3 that control operation of respective compressors 102-1, 102-2, 102-3 and control devices 122-1, 122-2, 122-3 that control operation of respective air dryers 108-1, 108-2, 108-3), and the user interface 126, as shown in FIG. 1A. However, it should be appreciated that the control system 114 illustrated is an example of a typical implementation, in other implementations, that control system 114 may comprise different 8 configurations and/or equipment without departing from the scope of the present disclosure.

As shown in FIG. 1B, the controller 116 includes a processor 128, a non-transitory computer-readable storage medium (e.g., memory 130), one or more input/output (I/O) ports 132, and a communications interface 134. In FIGS. 1A and 1B, the controller 116 is illustrated as a unitary component. However, those of skill in the art will understand that the controller 116 is not necessarily limited to this configuration. For example, in embodiments, the controller 116 may be implemented as a distributed system. In such embodiments, the controller 116 may comprise two or more different control units connected via a network (not shown).

The processor 128 provides processing functionality for the control system 114 and can include any number of processors, micro-controllers, or other processing systems, and resident or external memory for storing data and other information accessed or generated by the control system 114. The processor 128 can execute one or more software programs that implement the techniques described herein. The processor 128 is not limited by the materials from which it is formed, or the processing mechanisms employed therein and, as such, can be implemented via semiconductor(s) and/or transistors (e.g., using electronic integrated circuit (IC) components), and so forth.

The memory 130 is an example of a tangible, computer-readable storage medium that provides storage functionality to store various data associated with operation of the control system 114, such as software programs and/or code segments, or other data that may be executed by the processor 128, and possibly processing systems of other components of the control system 114 and/or the compressed air system 100 (FIG. 1A), to perform the functionality described herein. Thus, the memory 130 can store data, such as a program of instructions for operating the control system 114 (including its components), the compressed air system 100 (including its components), and so forth. It should be noted that while a single memory 130 is described, a wide variety of types and combinations of memory (e.g., tangible, non-transitory memory) can be employed. The memory 130 can be integral with the processor 110, can include stand-alone memory, or can be a combination of both.

The memory 130 can include but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the memory 130 can include removable integrated circuit card (ICC) memory, such as memory provided by a subscriber identity module (SIM) card, a universal subscriber identity module (USIM) card, a universal integrated circuit card (UICC), and so on.

The I/O ports 134 furnish interconnection of the controller 116 with other components of the control system 114 such as the user interface 126, the control devices 102, 108, and the various sensors of the sensor assembly 118, as shown in FIG. 1B, via a wired or wireless network, combinations thereof, and so forth. In this manner, the I/O ports 134 allow the processor 128 to interface with these components to send/receive data and commands/inputs. In embodiments, I/O ports 134 may include universal serial bus (USB) ports, Ethernet ports (e.g., RJ-45 ports), serial ports, parallel ports, HDMI ports, combinations thereof, and so forth, configured to permit communication via a wired network such as a wired Ethernet network, USB, serial connections, or the like.

I/O ports 134 may further include transmitters/receivers or transceivers configured to furnish communication via a wireless network. Example wireless networks may include but are not limited to: networks configured for communications according to one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; combinations thereof, and so forth.

The communication interface 134 furnishes interconnection of the controller 116 with external systems, networks 106, and the like. For example, the communication interface 134 and/or the processor 128 can be configured to communicate with a variety of different networks, including, but not necessarily limited to: a wireless computer communications network, such as a Wi-Fi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; RS-232; RS-422; CAN Bus; a wide-area cellular telephone network, such as a 3G cellular network, a 4G cellular network, a 5G cellular network, or a global system for mobile communications (GSM) network; and so on.

In embodiments, the communication interface 134 permits the control system 114 (e.g., the controller 116) to interface with external systems to send/receive data and commands/inputs. For example, one or more operators such as a plant manager, engineer, or the like, may access the control system 114 through the controller 116 from a remote device such as a computer, handheld device (e.g., a tablet, mobile phone, etc.) or the like, via the communication interface 134 to furnish input (commands) to the control system 114 for the compressed air system 100. The operator may further view operational data (e.g., pressures, flow rates, humidity/dew point levels, status and/or operational times for equipment (e.g., compressor status and run-time), and so forth). In embodiments, the communication interface 134 may facilitate secure connection of such remote devices via various data security techniques including, but not limited to, data encryption, system login requirements, biometric security protocols, combinations thereof, and so forth.

The user interface 126 may include one or more displays, such as LCD (Liquid Crystal Diode) displays, a TFT (Thin Film Transistor) LCD displays, an LEP (Light Emitting Polymer) or PLED (Polymer Light Emitting Diode) displays, and so forth, configured to display text and/or graphical information on a display screen to an operator of the control system 114. In embodiments, the user interface 126 can include gauges, dials, LCD or LED (light emitting diode) readouts, combinations thereof, and so forth, which may be used for displaying data and status information for the compressed air system 100 instead of or in addition to the one or more displays.

The user interface 126 may further include a control interface for input/entry of data and commands. In embodiments, the control interface can include a touch screen interface, so that the operator may use his or her fingers, a stylus, combinations thereof, and so forth, to manipulate images and/or selectable items displayed by the display. The touch screen can be disposed on one or more of the displays, external to the displays, or a combination thereof. In some embodiments, the user interface 126 may be operable by a combination of direct touch input received via the touch screen interface and input received external to the touch screen interface. For example, in embodiments, the control interface of the user interface 126 can include buttons, softkeys, keyboards, keypads, cursors, mouses, buttons, knobs, combinations thereof, and so forth, which may be used for entry of data and commands instead of or in addition to the touch screen.

The controller 116 provides functionality to the user interface 126 via the processor 128, the memory 130, I/O ports 132, and/or the communications interface 134. The processor 128 can be operably and/or communicatively coupled with components of the user interface 126. The processor 128 can control the components and functions of the control system 114 and/or the compressed air system 100 described herein using software, firmware, hardware (e.g., fixed logic circuitry), manual processing, or a combination thereof. The terms "controller," "functionality," "techniques" used herein generally represent software, firmware, hardware, or a combination of software, firmware, or hardware in conjunction with controlling the control system 114 and/or the compressed air system 100. The program code can be stored in one or more computer-readable memory devices (e.g., internal memory and/or one or more tangible media), and so on.

The controller 116 may control the operation of various components of the compressed air system 100 via the control devices 120, 122. For example, in the compressed air system 100 shown in FIG. 1A, the control devices 120-1, 120-2, 120-3 control operation of compressors 102-1, 102-2, 102-3, respectively, while the control devices 122-1, 122-2, 122-3 control operation of air dryers 108-1, 108-2, 108-3, respectively. The control devices 120-1, 120-2, 120-3 and 122-1, 122-2, 122-3 are electrically and/or mechanically interconnected with their respective equipment, compressors 102-1, 102-2, 102-3 and air dryers 108-1, 108-2, 108-3. In embodiments, the control devices 120-1, 120-2, 120-3 and 122-1, 122-2, 122-3 may themselves be controllers having processing capability (e.g., including some combination of processing systems, memory, I/O ports, communication interfaces, and/or user interfaces, depending on the equipment being controlled). In such embodiments, the control devices may monitor and control their respective component (compressors 102-1, 102-2, 102-3 and air dryers 108-1, 108-2, 108-3) in response to commands from the "primary" controller 116 and may communicate status and data from the equipment with the controller 116. In embodiments, the control devices 120-1, 120-2, 120-3 and 122-1, 122-2, 122-3 may also comprise electromechanical devices having no or limited processing capability (such as switches, solenoids, valves, etc.), that are controlled by the controller 116. In various embodiments, the control devices 120-1, 120-2, 120-3 and 122-1, 122-2, 122-3 may receive commands from the processor 128 via one or more I/O ports 132 of the controller 116, which cause the control devices 120-1, 120-2, 120-3 and 122-1, 122-2, 122-3 to control the operation of their respective equipment (e.g., turn the equipment on, shut the equipment off, increase/decrease the operational output of the equipment, disengage the equipment from the system 100, and so forth The sensor assembly 118 includes one or more sensors 136-142 that monitor operational parameters of the compressed air system 100 and furnish information and data to the controller 116 that are indicative of the sensed operational parameters. As shown in FIG. 1B, the sensor assembly 118 may comprise a variety of different kinds of sensors, including, but not limited to, pressure sensors 136 that sense (measure) the pressure of the air (compressed air within the system 100, ambient air, etc.), flow sensors 138 that sense (measure) the rate of flow of air (compressed air within the system 100, ambient air, etc.), temperature sensors 140 that sense (measure) the temperature of air (compressed air within the system, ambient air, etc.), and humidity/dew point sensors 142 that may sense (measure) the amount of water vaper in air (compressed air within the system 100 or ambient air) by, for example, determining the relative humidity of the air, the dew point of the air, combinations thereof, and so forth. It is contemplated that the sensor assembly 118 may further include other types of sensors depending on the requirements of the control system 114 and the compressed air system 100. Moreover, it will be appreciated that, while FIGS. 1A and 1B illustrate the sensor assembly 118 and its respective sensors 136-142 as a single block within the illustrated compressed air system 100, the sensors 136-142 of the sensor assembly 118 may be distributed throughout the compressed air system 100 to sense (measure) the operational parameters of the system 100 at desired locations. Thus, in an example implementation, the sensor system 118 could include one or more pressure sensors 136 to measure the pressure of compressed air output by the compressors 102-1, 102-2, 102-3, pressure and temperature sensors 136, 140 to measure the pressure and temperature of compressed air stored within the air storage tank 106, pressure and flow sensors 138, 138 to measure the pressure and flow of compressed air supplied to the plant by the compressed air system at the pressure regulator(s) 124, one or more humidity/dew point sensors to measure the relative humidity and or dew point of compressed air supplied by the air dryers 108-1, 108-2, 108-3, and so forth. It will be appreciated that the number, type, and location of sensors 136-142 of the sensor assembly 118 can vary and will be dependent on the configuration of the specific implementation of the compressed air system 100.

In accordance with the present disclosure, the control system 114 of the compressed air system 100 is configured to provide a mode of operation (herein an "away mode" of operation), wherein the control system 114 implements a temporary override of the normal (e.g., typical general day-to-day) operation of the compressed air system 100 for a period of time (e.g., during a period of down time for the plant, such as during a holiday, for a temporary plant shut down, for maintenance or retooling of the plant, etc.). In this manner, the control system 114 can minimize energy usage by the compressed air system 100 compared to the system 100 remaining fully operational. Further, by implementing an away mode of operation, the control system 114 can limit unnecessary wear on system equipment without fully shutting down the compressed air system 100, which would result in a time consuming and costly restart of the system 100 before it is again operational.

In embodiments, an operator enables the away mode of operation from the user interface 126, which furnishes an input to the controller 116. The controller 116 causes the control system 114 to temporarily override the normal operation of the compressed air system 100 and instead causes it to operate in a limited capacity. For example, in embodiments, the control system 114 may cause the compressed air system 100 to maintain limited system pressure (e.g., an "away mode pressure setpoint") within the receiver 104 (air storage tank 106) that is lower than the normal operational pressure of the system 100. Alternately or in addition, when the away mode of operation is enabled, the control system 114 may cause the compressed air system 100 to maintain a level of humidity or dew point (e.g., an away mode humidity level setpoint or an away mode dew point setpoint) within the system 100 (e.g., within the receiver 104 (air storage tank 106)) that is higher than the normal operational level of humidity or higher than the operational dew point of the system 100, and/or to maintain the compressed air at a temperature (e.g., an "away mode temperature setpoint") within the receiver 104 (air storage tank 106) that is higher than the normal operational temperature of the system 100, and so forth. These away mode setpoints, e.g., away mode pressure setpoint, away mode humidity setpoint, away mode dew point setpoint, away mode temperature setpoint, and the like, may be selected by the operator via the user interface 126, which causes those setpoints to be input to the controller 116.

In embodiments, while the away mode of operation is enabled, the control system 114 may select a limited number of components of the compressed air system to operate and thereafter add components to that selection, as necessary, to achieve and maintain the away mode setpoints (e.g., away mode pressure setpoint, away mode humidity setpoint, away mode Dew Point setpoint, away mode temperature setpoint, combinations thereof, and so forth). Thus, in the embodiment shown in FIG. 1A, the controller 116 can be configured to cause the compressors 102-1, 102-2, 102-3 and/or associated equipment such as air dryers 108-1, 108-2, 108-3, pre- and post-filters 110-1, 110-2, 110-3, 112-1, 112-2, 112-3, and so forth, to be successively turned on and/or off, as necessary to maintain the away mode settings of operation defined and input by the operator via the user interface 126.

For example, the controller 116 may cause a minimum number of the available compressors 102-1, 102-2, 102-3 to operate to maintain the away mode pressure (i.e., the pressure of the system specified by the away mode pressure setpoint), as sensed by a one or more pressure sensors 136 of the sensor assembly 118 (e.g., by a pressure sensor 136 configured to sense the pressure of the air storage tank 106). Thus, the controller 116 may initially cause only one of the available compressors, for example, the first compressor 102-1, to run for a minimum amount of time necessary to maintain the away mode pressure, as sensed by the pressure sensor 136. If the first compressor 102-1 is unable to maintain the pressure of the system at or above the away mode pressure or is unable to achieve the away mode pressure within a predetermined amount of time, the controller 116 may cause additional ones of the available compressors 102-2, 102-3 to operate to achieve and maintain the away mode pressure. For example, if the first compressor is unable to maintain the away mode pressure, controller 114 may cause the second compressor 102-2 to operate in addition to the operation of the first compressor 102-1 until the away mode pressure is achieved and maintained. Similarly, if the first and second compressors 102-1 and 102-2 are unable to maintain the away mode pressure, the controller 114 may cause the third compressor 102-3 to operate in addition to the operation of the first and second compressors 102-1, 102-2 until the away mode pressure is achieved and maintained.

In embodiments, the control system 114 may also cause components of the compressed air system 100, other than the compressors 102-1, 102-2, 102-3, to operate on a limited basis for the period of time during which away mode is enabled. For example, when the away mode is enabled, the control system 114 may cause the compressed air system 100 to maintain an away mode humidity level or an away mode dew point within the system 100 (e.g., within the receiver 104 (air storage tank 106)) as sensed by the humidity/dew point sensor(s) 142). The controller 116 may cause a minimum number of the available air dryers 108-1, 108-2, 108-3 to operate to maintain the away mode humidity or dew point, as sensed by a one or more humidity/dew point sensors 140 of the sensor assembly 118. Thus, in the embodiment illustrated in FIG. 1A, the controller 116 may cause only one of the available air dryers, for example, the first air dryer 102-1, to run for a minimum amount of time necessary to maintain the selected away mode humidity or dew point, as sensed by the humidity/dew point sensor(s) 140.

Generally, the first air dryer 108-1 operates (is utilized) only when the first compressor 102-1 is providing output. However, it is contemplated that the first compressor 102-1 may be run without corresponding operation of the first air dryer 108-1 (e.g., the first air dryer 108-1 may remain turned off or may be bypassed). Thus, when the controller 116 causes additional ones of the available compressors 102-2, 102-3 to operate to achieve and maintain the away mode pressure, corresponding air dryers 108-2, 108-3 may be operated (utilized) as necessary to maintain the away mode humidity level, dew point, and/or temperature.

In embodiments, the control system 114 may further cause equipment and components of the compressed air system 100 to operate according to a schedule of operation for the period of time during which the away mode is enabled. For example, in an embodiment, the controller 116 may implement a preprogrammed schedule of operation that always causes the compressors 102-1, 102-2, 102-3, and/or associated equipment such as air dryers 108-1, 108-2, 108-3, pre- and post-filters 110-1, 110-2, 110-3, 112-1, 112-2, 112-3, and so forth, according to a pre-set schedule (e.g., in a predetermined order). Thus, the controller 116 may always cause the first compressor 102-1 to be turned on first, then, if necessary, the second compressor 102-2, to be turned on next, the third compressor 102-3 to be turned on thereafter, and so forth to maintain the away mode pressure as described above.

The controller 116 can also be configured to cause the compressors 102-1, 102-2, 102-3 and/or associated equipment such as air dryers 108-1, 108-2, 108-3, pre- and post-filters 110-1, 110-2, 110-3, 112-1, 112-2, 112-3, and so forth, to be turned on, as needed, according to a schedule of operation set by the operator via the user interface 126. Thus, in an implementation, the user may select a schedule (order) via the user interface 126 that is thereafter implemented by the controller 116, which causes the second compressor 102-2 to be turned on first, then, if necessary, the first compressor 102-1, to be turned on next, the third compressor 102-3 to be turned on thereafter, and so forth.

In embodiments, the control system 114 can further be configured to vary the schedule of operation of the compressors 102-1, 102-2, 102-3 and/or associated equipment such as air dryers 108-1, 108-2, 108-3, pre- and post-filters 110-1, 110-2, 110-3, 112-1, 112-2, 112-3, and so forth, when away mode. For example, the controller 116 may be configured to rotate the sequence (order) that the compressors 102-1, 102-2, 102-3 (and/or associated equipment such as air dryers 108-1, 108-2, 108-3, pre- and post-filters 110-1, 110-2, 110-3, 112-1, 112-2, 112-3, and so forth) are turned on each time the air storage tank 104 must be recharged to maintain the away mode pressure (e.g., the pressure sensed withing the air storage tank 106 falls below a threshold pressure requiring the tank 106 to be recharged to maintain the desired away mode pressure). Thus, a first time that the air storage tank 104 must be recharged, the controller 116 may cause the first compressor 102-1 to be turned on first, then, if necessary, the second compressor 102-2, to be turned on next, the third compressor 102-3 to be turned on thereafter, and so forth. The next time that the air storage tank 104 must be recharged, the controller 116 may rotate the schedule of operation so that the second compressor 102-2 is turned on first, then, if necessary, the third compressor 102-3 is turned on next, while the first compressor 102-1 is turned on last. The third time that the air storage tank 104 must be recharged, the controller 116 may again rotate the schedule so that the third compressor 102-3 is turned on first, while the first compressor 102-1 and the second compressor 102-2 are turned on last. The controller 116 may continue to rotate the schedule, including turning on and/or off other equipment of the compressed air system as necessary, each time the air storage tank 104 must be recharged during the period the away mode of operation is enabled.

In embodiments, the user interface 126 can allow the operator to input, select, and/or modify a customized schedule of operation of the equipment and components of the compressed air system 100. This schedule of operation is then implemented by the controller 116 when the away mode of operation in enabled. In this manner, for example, the control system 114 can account for non-functioning equipment, vary the relative amounts of operational time that various equipment of the compressed air system 100 operate, and so forth. The controller 114 may also be provided with functionality to generate customized schedules of operation without operator input. For example, the controller 114 may implement functionality to track operational parameters of the equipment of the compressed air system (e.g., compressors 102-1, 102-2, 102-3 and/or associated equipment such as air dryers 108-1, 108-2, 108-3, pre- and post-filters 110-1, 110-2, 110-3, 112-1, 112-2, 112-3, and so forth) and create a schedule of operation based on those operational parameters. Example operational parameters that may be tracked include, but are not limited to, age of the equipment, total operational time of the equipment, efficiency of the equipment, time since last service, maintenance, or overhaul of the equipment, output of the equipment, reliability of the equipment, and so forth. For example, the controller may create a schedule of operation for the compressors 102-1, 102-2, 102-3 based on age or operational time (e.g., to minimize use of the oldest compressors) or efficiency (e.g., to minimize consumption of electricity during a down time), time since last overhaul (e.g., to minimize cost for maintenance), and so forth.

In embodiments, the control system 114 may further cause equipment within the compressed air system 100 to operate even though all away mode settings are met by quantities sensed by the sensor assembly 118. For example, in some implementations, it may be beneficial to periodically run some types of compressors (e.g., oil-lubricated compressors, oil-flooded compressor, etc.) to improve the performance and life of the compressors. In such implementations, the control system 114 (controller 116) may cause the compressors 102-1, 102-2, 102-3 to periodically run for a short period of time even though the pressure within the compressed air system 100 is above the away mode pressure.

Similarly, in some implementation, compressors 102-1, 102-2, 102-3 may be employed that have a minimum run time to maximize their operational life, reliability, and so forth. In such embodiments, once the pressure withing the compressed air system 100 reaches the away mode pressure, the controller 116 may continue causing eh compressors 102-1, 102-2, 102-3 to continue operating until the minimum run time is reached.

Figure 2A:
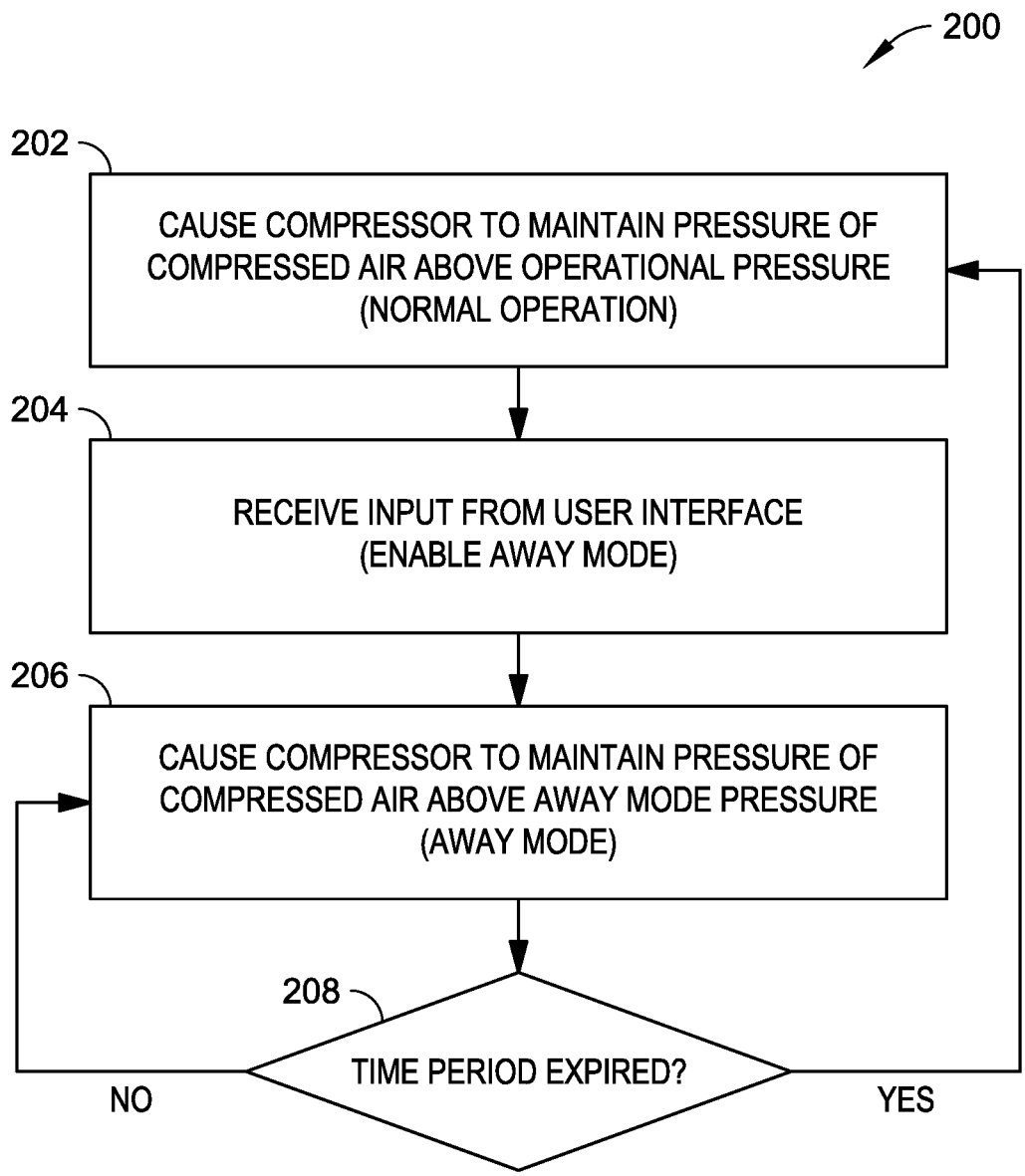
FIGS. 2A, 2B, and 2C are flow diagrams illustrating a method that may be employed by a control system, such as the example control system shown in FIG. 1B, for implementing an away mode of operation in accordance with an example embodiment of the present disclosure.
Figure 2B:
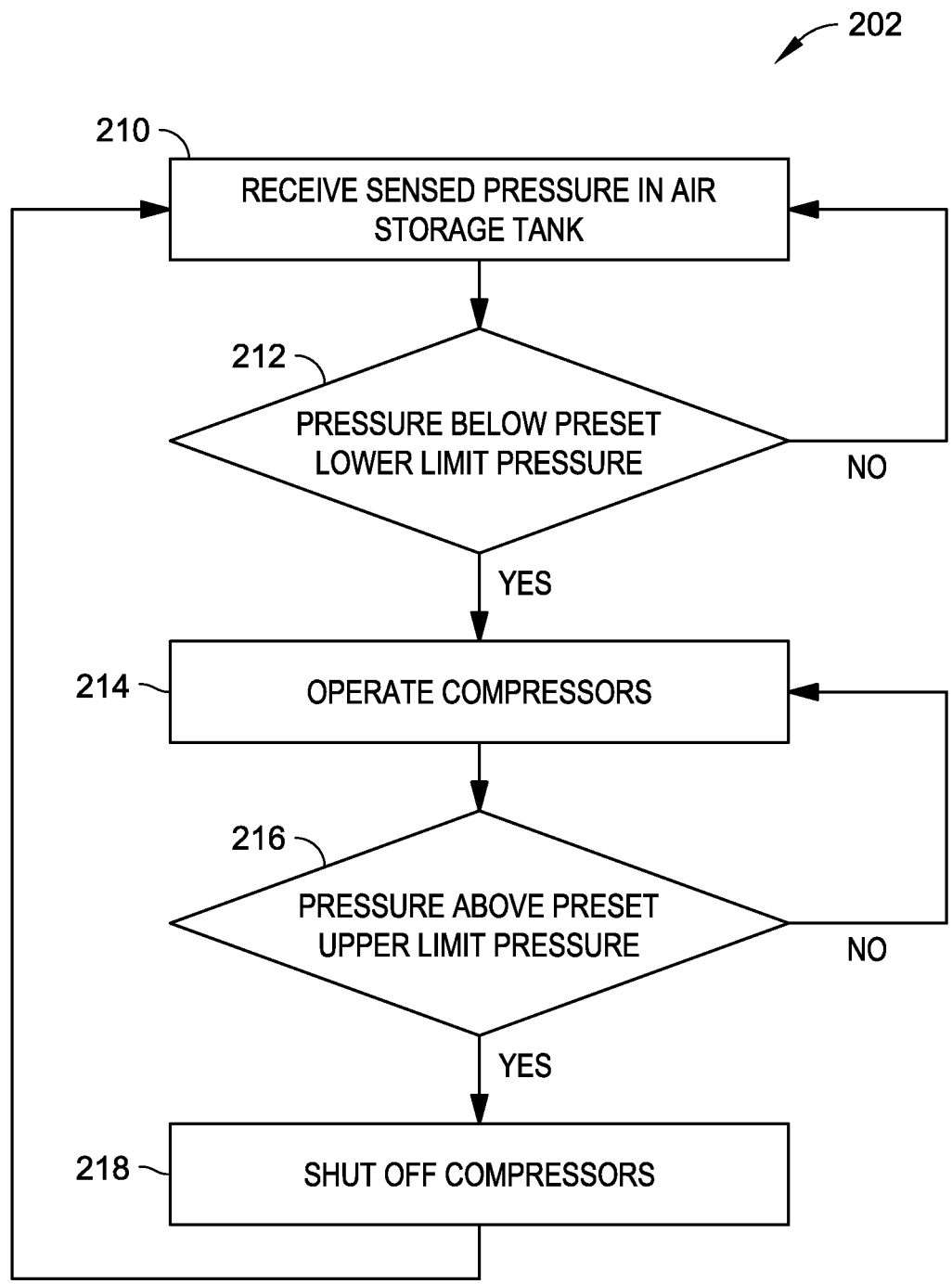
Figure 2C:
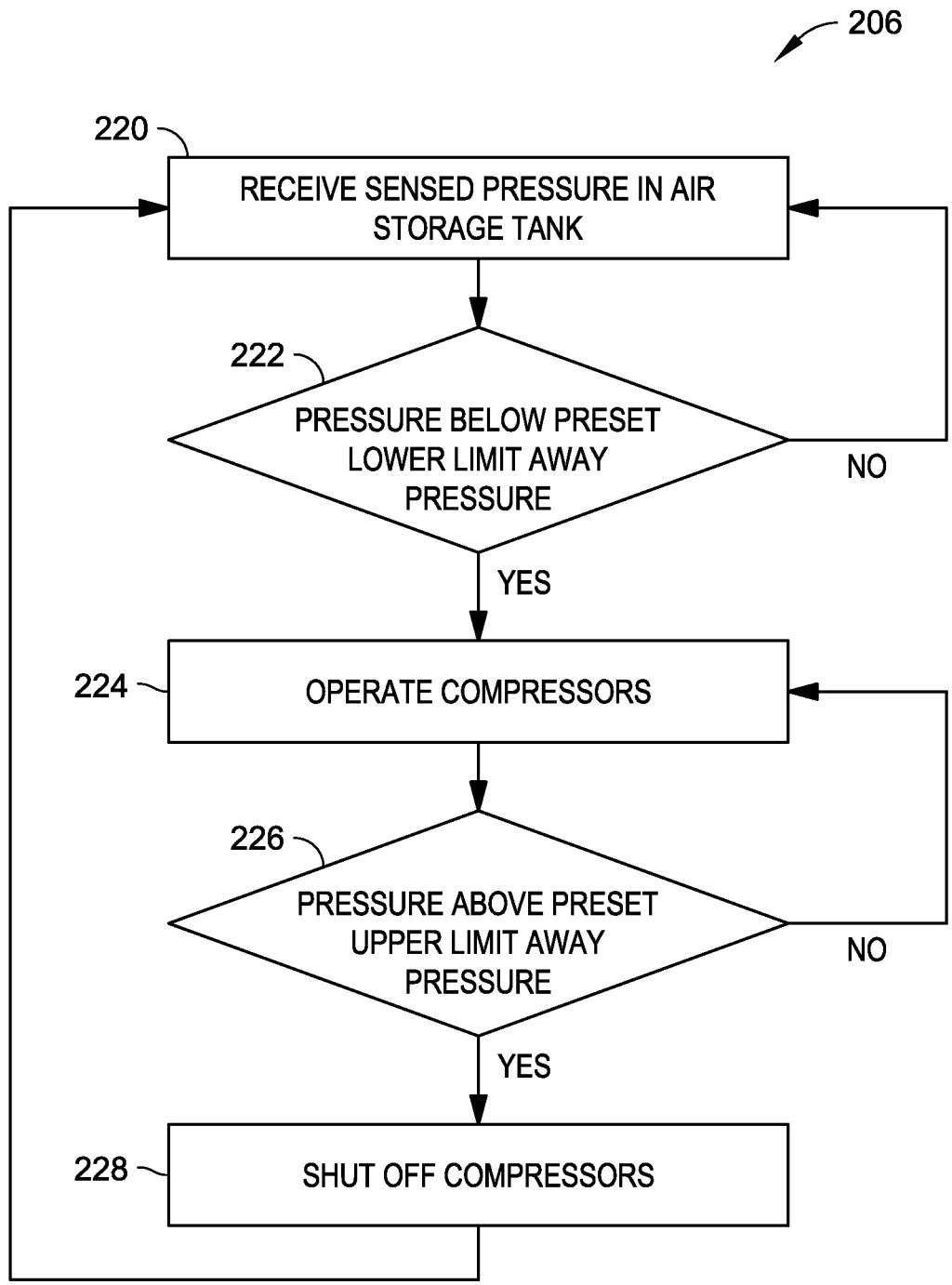

FIGS. 2A, 2B, and 2C illustrate a method 200 for implementing an away mode of operation of the compressed air system 100 in accordance with an example embodiment of the present disclosure. In embodiments, the method 200 may be implemented as a program of instructions (e.g., software, firmware, etc.) that may be stored in memory 130 and executed by the controller 116 of the control system 114 shown in FIG. 1B for the compressed air system shown in FIG. 1A.

As shown in FIG. 2A, with reference to FIGS. 1A and 1B, during normal operation (Block 202), the control system 114 (controller 116) causes the air compressors 102-1, 102-2, 102-3 to maintain the pressure of compressed air in the compressed air system 100, as sensed by the sensor assembly 118 (e.g., the pressure in the air storage tank 106 as sensed by pressure sensor 136). Specifically, the control system 114 causes the compressors 102-1, 102-2, 102-3 to operate to maintain the pressure above a first (operational) pressure that is sufficient to operate one or more air powered devices within the plant. This operational pressure may be determined based on an operational pressure setpoint for the system 100.

As shown in FIG. 2B, for example, the controller 116 may receive and monitor the pressure of compressed air in the air storage tank 106 sensed by the pressure sensor 136 (Block 210). The controller 116 determines, based on the monitored pressure, whether the pressure of the compressed air in the air storage tank 106 is below a preset lower limit pressure (Block 212). Where the pressure of the compressed air in the air storage tank 106 is determined to not be below the lower limit pressure ("NO" at Block 212), the controller 116 continues monitoring the pressure. Where, however, the pressure of the compressed air in the air storage tank 106 is determined to be below the lower limit pressure ("YES" at Block 212), the controller 116 causes the compressors 102-1, 102-2, 102-3 to operate to recharge the tank 106 (Block 214). The controller 116 may continue causing the compressors 102 to operate while monitoring the pressure within the air storage tank 106. The controller 116 then determines, based on the monitored pressure, whether the pressure of compressed air in the air storage tank 106 is above a preset upper limit pressure (Block 216). Where the pressure of the compressed air in the air storage tank 106 is determined to not be above the upper limit pressure ("NO" at Block 216), the controller 116 continues monitoring the pressure. Where, however, the pressure of the compressed air in the air storage tank 106 is determined to be above the upper limit pressure ("YES" at Block 216), the controller 116 causes the compressors 102-1, 102-2, 102-3 to discontinue operating (shut off) (Block 218). The controller 116 then continues to monitor the pressure of compressed air in the air storage tank 106 sensed by the pressure sensor 136 (Block 210) as the pressure is drawn down by operation of air powered devices in the plant. In embodiments, the lower limit pressure is equal to or greater than the Operational pressure of the compressed air system 100. The upper limit pressure greater than the lower limit pressure and may vary depending on the particular implementation of the compressed air system 100. However, the upper limit pressure is less than the allowable (rated) pressure of the air storage tank 106.

Referring again to FIG. 2A, the control system 114 (controller 116) receives an input from the user interface 126 enabling away mode (enabling the away mode of operation) (Block 204). The input may include away mode settings such as an away mode pressure setpoint, or the like. In embodiments, the operator enables the away mode and enters the away mode settings, whereupon the user interface 126 furnishes the input in response thereto to the controller 116. Responsive to receiving the input from the user interface 126 enabling away mode, the control system 114 (controller 116) places the compressed air system 100 in the away mode of operation and causes the compressors to maintain the pressure of the compressed air in the system above the away mode pressure specified by the away mode setpoint (Block 206). As described herein, the away mode pressure is less that the normal Operational pressure of the compressed air system 100.

As shown in FIG. 2C, for example, the controller 116 may receive and monitor the pressure of compressed air in the air storage tank 106 sensed by the pressure sensor 136 (Block 220). The controller 116 determines, based on the monitored pressure, whether the pressure of the compressed air in the air storage tank 106 is below an away mode lower limit pressure determined based on the away mode pressure setpoint (Block 222). Where the pressure of the compressed air in the air storage tank 106 is determined to not be below the away mode lower limit pressure ("NO" at Block 212), the controller 116 continues monitoring the pressure. Where, however, the pressure of the compressed air in the air storage tank 106 is determined to be below the lower limit pressure ("YES" at Block 212), the controller 116 causes one or more of the compressors 102-1, 102-2, 102-3 to operate according to the schedule of operation to increase the pressure of the compressed air in the air storage tank 106 (Block 224). The controller 116 then continues causing the compressors 102 to operate according to the schedule of operation while monitoring the pressure within the air storage tank 106. The controller 116 then determines, based on the monitored pressure, whether the pressure of compressed air in the air storage tank 106 is above a preset away mode upper limit pressure (Block 226). Where the pressure of the compressed air in the air storage tank 106 is determined to not be above the away mode upper limit pressure ("NO" at Block 226), the controller 116 continues monitoring the pressure. In embodiments, if the pressure also fails to increase to the away mode lower limit pressure within a predetermined period of time or continues to decrease, the controller 116 may increase the number of compressors 102-1, 102-2, 102-3 operating according to the schedule of operation (e.g., may turn on additional compressors 102-1, 102-2, 102-3) as described herein. Where, however, the pressure of the compressed air in the air storage tank 106 is determined to be above the away mode upper limit pressure ("YES" at Block 226), the controller 116 causes the then operating compressors 102-1, 102-2, 102-3 to discontinue operating (shut off) (Block 228). The controller 116 then continues to monitor the pressure of compressed air in the air storage tank 106 sensed by the pressure sensor 136 (Block 220).

As shown in FIG. 2A, the control system 114 (controller 116) monitors the time (e.g., via an internal clock within the processor 128) and determines whether the period of time for which the away mode of operation is enabled has expired (Block 208). Where the control system 14 (controller 116) determines the time period has not expired ("NO" at block 208), it continues the operation of the compressors 102-1, 102-2, 102-3 according to the schedule of operation. Where, however, the control system 14 (controller 116) determines the time period has expired ("Yes" at Block 208), the control system 114 (controller 116) returns the compressed air system 100 to normal operation (Block 202). In this manner, the away mode pressure selected by the operator is maintained over the period of time entered by the operator, whereupon the control system 114 (controller 116) may automatically return the compressed air system 100 to its normal mode of operation.

As described herein, in embodiments, the control system 114 (controller 116) may further employ methods and techniques similar to the method and techniques 200 shown in FIGS. 2A, 2B, and 2C to cause components of the compressed air system 100, other than the compressors 102-1, 102-2, 102-3, to operate on a limited basis for the period of time during which away mode is enabled. For example, when away mode is enabled, the control system 114 (controller 116), in addition to causing the compressed air system to maintain an away mode pressure, may cause the system 100 to maintain an away mode humidity level or an away mode dew point within the system 100 (e.g., within the air storage tank 106) as sensed by the humidity/dew point sensor(s) 142). The controller 116 may cause a minimum number of the available air dryers 108-1, 108-2, 108-3 to operate to maintain the away mode humidity or dew point, as sensed by a one or more humidity/dew point sensors 140 of the sensor assembly 118.

Figure 3:
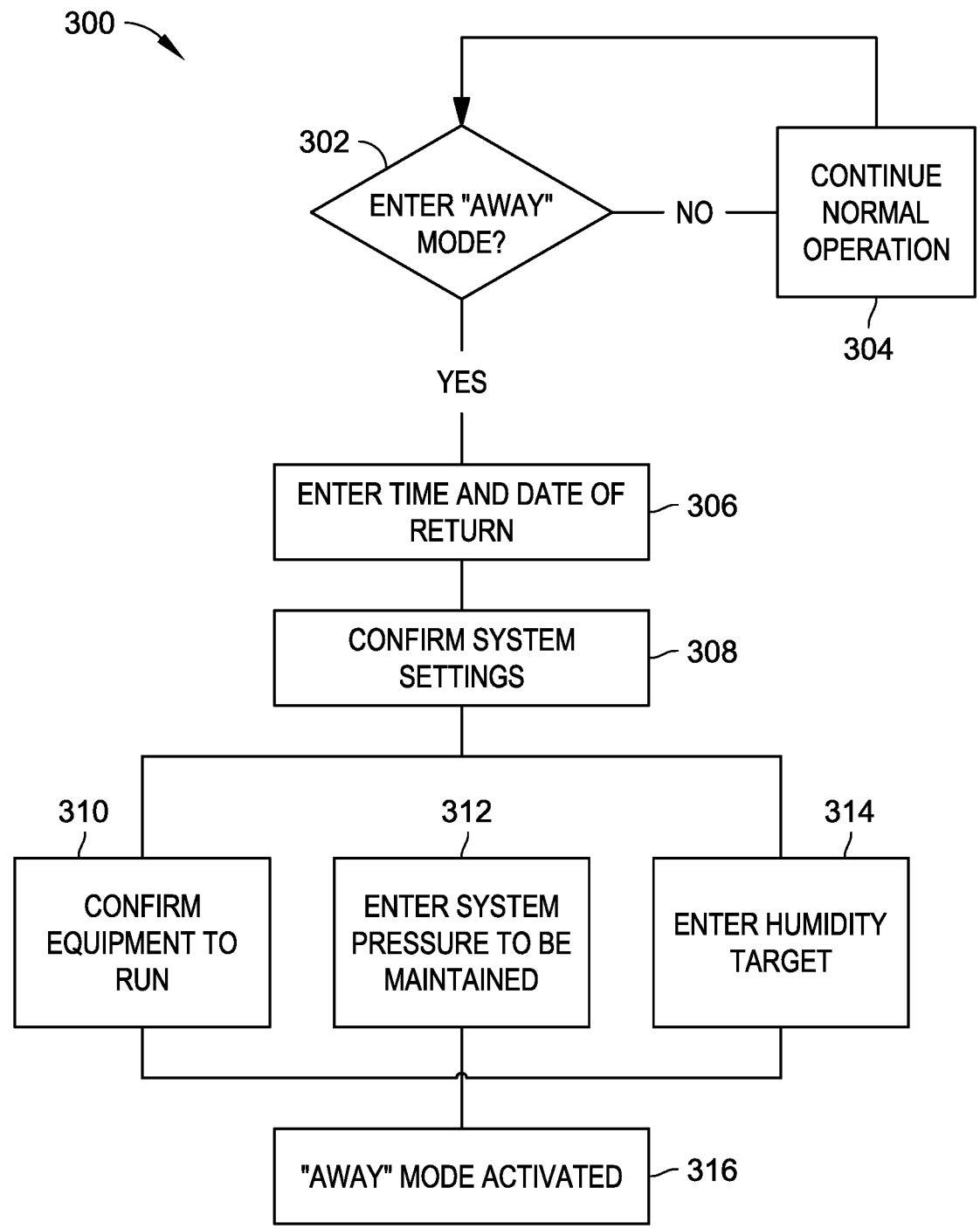
FIG. 3 is a flow diagram illustrating a method for enabling an away mode of operation by a control system, such as the example control system shown in FIG. 1B, in accordance with an example embodiment of the present disclosure.

FIG. 3 illustrated a method 300 for enabling the away mode of operation by a control system, such as the control system 114 shown in FIGS. 1A and 1B, in accordance with an example embodiment of the present disclosure. In embodiments, the method 300 may be implemented as a program of instructions (e.g., software, firmware, etc.) that may be stored in memory 130 and executed by the controller 116 of the control system 114 shown in FIG. 1B for the compressed air system shown in FIG. 1A.

As shown, the controller 116 of the control system 114 may monitor the user interface 126 to determine if the operator wishes to enable (enter) the away mode of operation of the compressed air system (Block 302). For example, the controller may cause the user interface 126 to display a prompt such as a menu command, data field, a button, a switch, combinations thereof, or the like, that allows an operator to select the away mode of operation by selecting the prompt. Unless and until the away mode of operation is enabled (e.g., until the prompt is selected) by the operator ("NO" at Block 302), the controller 116 causes the compressed air system 100 to continue normal operation (Block 304) while the system 100 is operational (not shut down). When the controller 116 detects an input from the operator to the user interface 126 to enable (enter) the away mode of operation (e.g., the operator responds to (or selects) the prompt displayed by the user interface 126), the controller 116 may cause the user interface 126 to display an additional prompt to enter the period of time for which the away mode of operation of the compressed air system is enabled (Block 306). For example, in the embodiment illustrated, the controller 116 may cause the user interface 126 to display an additional menu command, data field, a button, a switch, combinations thereof, or the like, that allows an operator to select the date and time that the away mode of operation of the compressed air system 100 is to end (or the date and time that operation of the plant is to resume from which the controller 116 can calculate the date and time to end the away mode of operation and allow the system to reach operational pressure) (Block 306). The operator may further be prompted to enter the start time for enabling the away mode of operation if its start is to be delayed. The user interface 126 returns this input to the controller 116, which utilizes this input to determine the period of time for which the away mode of operation is to last.

The controller 116 may cause the user interface 126 to prompt (e.g., display an additional menu command, data field, a button, a switch, combinations thereof, or the like) that allows an operator to select the operator to confirm the away mode system settings (Block 308) to be used by the control system 114. For example, the controller 116 may cause the user interface 126 to prompt the operator to confirm the equipment of the compressed air system to be run and the order in which it is to be run by selecting or creating a schedule of operation for the away mode of operation (Block 310) as discussed herein. Similarly, the controller 116 may cause the user interface 126 to prompt the user to enter the away mode pressure (Block 312). In embodiments, the user interface 126 may prompt the operator to enter the away mode pressure, from which the controller 116 may determine (e.g., calculate or look up in a look up table stored in the memory 130) the away mode upper limit pressure and away mode lower limit pressure. In other embodiments, the operator may be prompted to enter the away mode upper limit pressure and away mode lower limit pressure. In embodiments, the user interface 126 may further prompt the operator to enter the away mode humidity or dew point (Block 314) as well as temperature, minimum run time of compressors, or other settings in a similar fashion. The controller 116 may then enable the away mode of operation for the compressed air system 100 (Block 316).

Moreover, in embodiments, the control system 114 may allow the operator to enter downtime information into a calendar that is stored in the memory 130 of the controller. Such downtime information can include the dates and times the downtimes will begin and end (or the length of the downtime), the away mode setpoints (e.g., away mode pressure setpoints) for the downtimes, and so forth. In this manner, the operator can enter, via the user interface, a calendar specifying expected down times for the plant over a period of operation of the plant (e.g., a year) so that the control system 114 can automatically enable away modes of operation for the compressed air system 100 during the downtimes scheduled in the calendar.

Figure 4A:
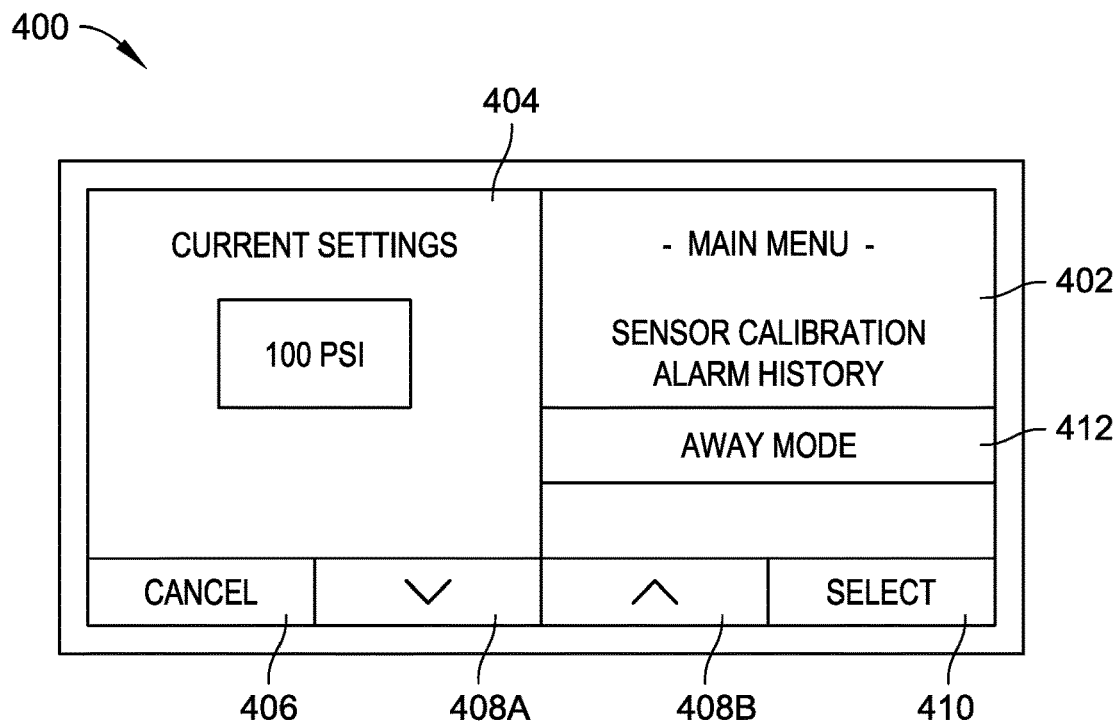
FIGS. 4A, 4B and 4C are diagrammatic views illustrating a user interface of a control system, such as the control system shown in FIG. 1B, that is configured to facilitate selection of an away mode of operation for a compressed air system, such as the compressed air system shown in FIG. 1A, in accordance with an example embodiment of the present disclosure.
Figure 4B:
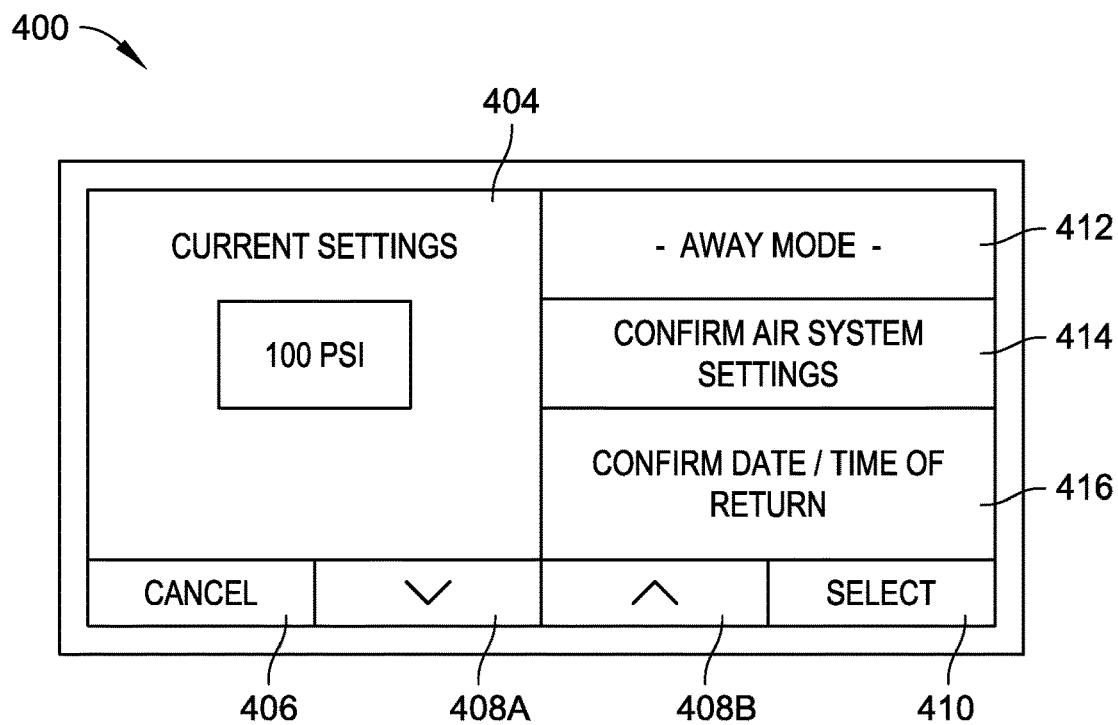
Figure 4C:
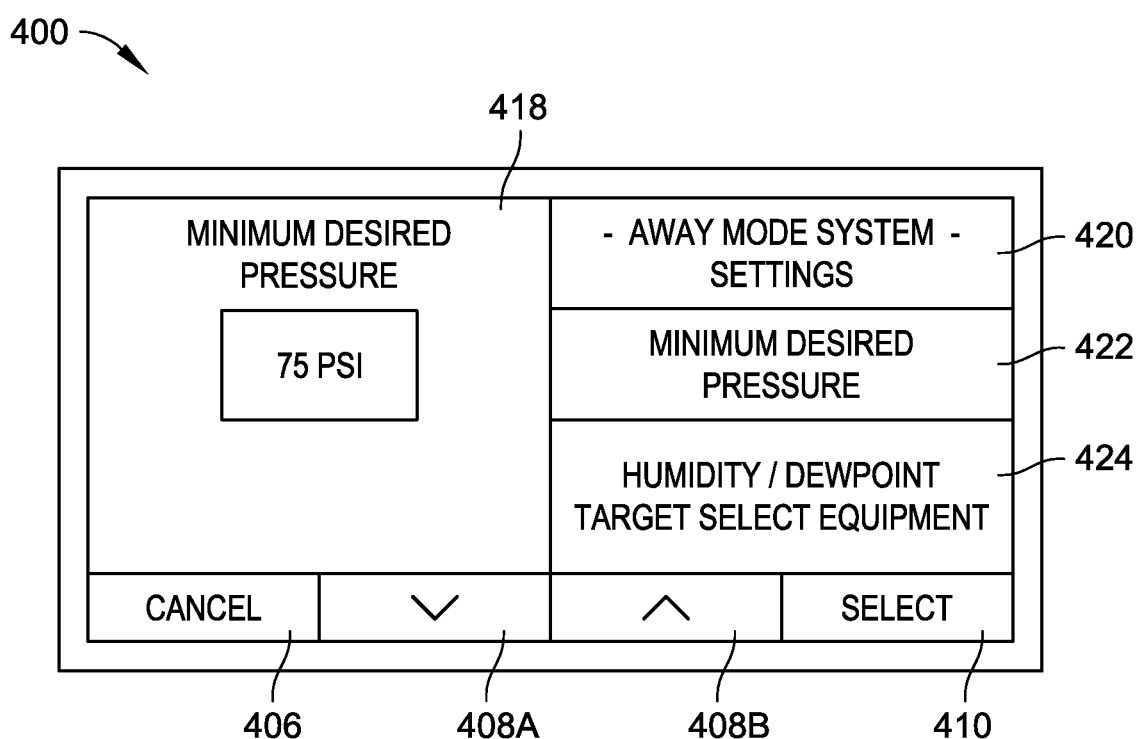

FIGS. 4A, 4B and 4C depict a graphical user interface (GUI) 400 that may be displayed by a display of the user interface 126 of the control system 114 shown in FIG. 2 in accordance with an example embodiment of the disclosure.

As shown, the graphical user interface 400 includes a main menu 402, a current settings/status display panel 404, and menu controls (buttons) such as "CANCEL" 106, up and down menu scrolling buttons 408A, 408B, respectively, and a "SELECT" 410, which may be activated (e.g., "clicked") via a touchscreen overlaying the display, a mouse, a keypad, a keyboard, a trackpad, or the like. The main menu 402 provides an interface for the operator to interface with the equipment of the compressed air system 100. The main menu 402 may furnish access to sub-menus 412, 420 of the graphical user interface 400 which allows the operator to access setting displays, status displays, equipment controls, setting entry fields, and so forth. For example, the main menu 402 may include one or more buttons that allow the operator to select a desired submenu. The status/setting display 404, 418 is configured to provide display of system and/or equipment status, current settings, and so forth. The menu controls "CANCEL" 106, up and down menu scrolling buttons 408A, 408B, respectively, and a "SELECT" 410, facilitate navigation of the menu 402 and submenus 412, 428.

The graphical user interface 400 is configured to allow selection of an away mode of operation for the compressed air system 100 shown in FIG. 1A in accordance with example embodiments of the present disclosure. In the embodiment illustrated, the menu 400 includes a button for allowing the operator selecting the "AWAY MODE" submenu 412 shown in FIG. 4B. The away mode submenu 412 further includes buttons that allow 24 the operator to select or enter settings for the compressed air system 100 during the away mode of operation (e.g., the "CONFIRM AIR SYSTEM SETTINGS" button 414), enter the period of time for with the away mode is enabled (e.g., the "CONFIRM DATE/TIME OF RETURN" button 416), and so forth. For example, an operator may select ("click") the "CONFIRM AIR SYSTEM SETTINGS" button 414, to access the "AWAY MODE SYSTEM SETTINGS" submenu 420 shown in FIG. 4C. This submenu 420 may in turn include buttons that allow the operator to enter the away mode pressure setpoint (e.g., "MINIMUM DESIRED PRESSURE" button 422, humidity/dew point setpoints (e.g., "HUMIDITY/DEWPOINT TARGE SELECT EQUIPMENT" button 424, and so forth as described herein.

It will be appreciated that the graphical user interface 400 shown is simplified for the purpose of illustrating the basic operation of the user interface 126 of the control system 114. Graphical user interfaces 400 employed by compressed air systems 100 that employ an away mode of operation in accordance with the present disclosure may contain a variety of other elements (e.g., displays, controls, buttons, system flow diagrams, status displays, etc.) that allow the operator to monitor and control the operation of the compressed air system 100.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A compressed air system, comprising:
   at least one air compressor configured to supply compressed air to the compressed air system;
   a sensor assembly configured to sense a pressure of compressed air in the compressed air system;
   a controller communicatively coupled with the at least one air compressor and the sensor assembly, the controller configured to:
   receive a pressure of the compressed air in the compressed air system sensed via a sensor assembly;
   cause the at least one air compressor to maintain the pressure of compressed air in the compressed air system sensed by the sensor assembly above a first pressure, the first pressure sufficient to operate one or more air powered devices;
   receive an input from a user interface;
   in response to the input, cause the at least one air compressor to maintain the pressure of compressed air in the compressed air system sensed by the sensor assembly above a second pressure, the second pressure less than the first pressure, for a period of time; and
   cause the at least one air compressor to again maintain the pressure of compressed air in the compressed air system sensed by the sensor assembly above the first pressure after the period of time has expired; and
   a humidity sensor assembly communicatively coupled with the controller for sensing a humidity level of compressed air in the air compressor system, wherein the air compressor system comprises at least one dryer configured to maintain a humidity level of the compressed air system below a first humidity level, and wherein the controller causes the at least one dryer to maintain the humidity of compressed air in the compressed air system sensed by the humidity sensor assembly below the first humidity level, during the period of time.

2. The compressed air system as recited in claim 1, wherein the at least one air compressor comprises a plurality of air compressors, and wherein the controller causes the air compressors of the plurality of air compressors to intermittently operate in an alternating pattern to maintain the pressure of compressed air in the compressed air system sensed by the sensor assembly above the second pressure during the period of time.

3. The compressed air system as recited in claim 1, further comprising a user interface configured to allow the input to be provided to the controller.

4. The compressed air system as recited in claim 3, wherein the user interface further allows input of at least one of a start time and an end time for the period of time.

5. The compressed air system as recited in claim 4, wherein the user interface is configured to allow a user to select an away mode for the compressed air system, whereupon the user interface furnishes the input to the controller and the at least one of the start time and the end time to the controller.

6. The compressed air system as recited in claim 1, further comprising an air receiver for storing the compressed air, the compressed air in the air receiver being recharged by the at least one air compressor.

7. A control system for a compressed air system having at least one air compressor operable to supply compressed air to the compressed air system, the control system comprising:
   a sensor assembly configured to sense a pressure of the compressed air in the compressed air system;
   a controller communicatively coupled with the at least one air compressor and the sensor assembly, the controller configured to cause the at least one air compressor to maintain the pressure of compressed air in the compressed air system sensed by the sensor assembly above a first pressure, the first pressure sufficient to operate one or more air powered devices, and to turn the at least one air compressor off, wherein the pressure of compressed air in the compressed air system is not maintained,
   wherein the controller is configured to receive an input and, in response to the input, cause the at least one air compressor to maintain the pressure of compressed air in the compressed air system sensed by the sensor assembly above a second pressure, the second pressure less than the first pressure, for a period of time; and
   a humidity sensor assembly communicatively coupled with the controller for sensing a humidity level of compressed air in the air compressor system, wherein the air compressor system comprises at least one dryer configured to maintain a humidity level of the compressed air system below a first humidity level, and wherein the controller causes the at least one dryer to maintain the humidity of compressed air in the compressed air system sensed by the humidity sensor assembly below the first humidity level, during the period of time.

8. The control system as recited in claim 7, wherein the controller causes the at least one air compressor to again maintain the pressure of compressed air in the compressed air system sensed by the sensor assembly above the first pressure after the period of time has expired.

9. The control system as recited in claim 7, wherein the at least one air compressor comprises a plurality of air compressors, and wherein the controller causes the air compressors of the plurality of air compressors to intermittently operate in an alternating pattern to maintain the pressure of compressed air in the compressed air system sensed by the sensor assembly above the second pressure during the period of time.

10. The control system as recited in claim 7, further comprising a user interface configured to allow the input to be provided to the controller.

11. The control system as recited in claim 10, wherein the user interface further allows input of at least one of a start time and an end time for the period of time.

12. The control system as recited in claim 11, wherein the user interface is configured to allow a user to select an away mode for the compressed air system, whereupon the user interface furnishes the input and the at least one of the start time and the end time to the controller.

13. A method for controlling operation of a compressed air system having at least one air compressor operable to supply compressed air to the compressed air system, the method comprising:
   receiving a pressure of the compressed air in the compressed air system sensed via a sensor assembly;
   causing the at least one air compressor to maintain the pressure of compressed air in the compressed air system sensed by the sensor assembly above a first pressure, the first pressure sufficient to operate one or more air powered devices;
   receiving an input from a user interface;
   in response to the input, causing the at least one air compressor to maintain the pressure of compressed air in the compressed air system sensed by the sensor assembly above a second pressure, the second pressure less than the first pressure, for a period of time; and
   sensing, using a humidity sensor assembly, a humidity level of compressed air in the air compressor system, wherein the air compressor system comprises at least one dryer configured to maintain a humidity level of the compressed air system below a first humidity level, and causing the at least one dryer to maintain the humidity of compressed air in the compressed air system sensed by the humidity sensor assembly below the first humidity level, during the period of time.

14. The method as recited in claim 13, further comprising causing the at least one air compressor to again maintain the pressure of compressed air in the compressed air system sensed by the sensor assembly above the first pressure after the period of time has expired.

15. The method as recited in claim 13, further comprising causing, wherein the at least one air compressor comprises a plurality of air compressors, the air compressors of the plurality of air compressors to intermittently operate in an alternating pattern to maintain the pressure of compressed air in the compressed air system sensed by the sensor assembly above the second pressure during the period of time.

16. The method as recited in claim 13, further comprising receiving, via the user interface, input of at least one of a start time and an end time for the period of time.

17. The method as recited in claim 16, wherein the user interface is configured to allow a user to select an away mode for the compressed air system and to enter the at least one of the start time and the end time to the controller.

* * * * *